United States Patent
Knox et al.

(10) Patent No.: US 10,362,391 B2
(45) Date of Patent: Jul. 23, 2019

(54) ADJUSTING AUDIO CONTENT BASED ON AUDIENCE

(71) Applicant: Lenovo (Singapore) Pte. Ltd., Singapore (SG)

(72) Inventors: Jonathan Gaither Knox, Morrisville, NC (US); John Carl Mese, Cary, NC (US); Nathan J. Peterson, Durham, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 152 days.

(21) Appl. No.: 14/523,099

(22) Filed: Oct. 24, 2014

(65) Prior Publication Data

US 2016/0119713 A1    Apr. 28, 2016

(51) Int. Cl.
| | | |
|---|---|---|
| H04R 3/00 | (2006.01) | |
| G10L 15/26 | (2006.01) | |
| G10L 17/00 | (2013.01) | |
| G06K 9/00 | (2006.01) | |
| H04N 21/439 | (2011.01) | |
| H04N 21/454 | (2011.01) | |

(52) U.S. Cl.
CPC .......... *H04R 3/00* (2013.01); *G06K 9/00838* (2013.01); *H04N 21/4394* (2013.01); *H04N 21/4396* (2013.01); *H04N 21/4542* (2013.01); *G10L 15/26* (2013.01); *G10L 17/00* (2013.01); *H04R 2430/01* (2013.01)

(58) Field of Classification Search
CPC .......... G01N 21/8851; G06K 9/00288; G06K 9/00838; G10L 15/26; G10L 17/00; H04N 21/4394; H04N 21/4396; H04N 21/4542; H04R 2430/01; H04R 3/00; B05B 12/124; B05D 5/005
USPC .......... 381/2, 26, 56, 59, 71.1, 300, 311, 77, 381/303; 725/25; 348/77; 704/251; 700/94
See application file for complete search history.

(56) References Cited

U.S. PATENT DOCUMENTS

| | | | | |
|---|---|---|---|---|
| 6,199,076 B1 * | 3/2001 | Logan | ............... | G06F 17/30053 434/319 |
| 8,612,605 B2 * | 12/2013 | McCoy | ............... | H04L 12/2807 709/224 |
| 9,002,835 B2 * | 4/2015 | Sharifi | ............... | G06Q 30/0631 707/723 |
| 9,563,927 B2 * | 2/2017 | Sinclair | ................. | G06T 1/0064 |
| 10,115,370 B2 * | 10/2018 | Min | ....................... | G09G 5/006 |
| 10,123,064 B2 * | 11/2018 | Chae | .................... | H04N 21/251 |
| 10,149,077 B1 * | 12/2018 | Adams | ................... | H04R 27/00 |
| 10,156,455 B2 * | 12/2018 | Bennett | ................... | G10L 21/00 |
| 10,200,427 B2 * | 2/2019 | Cabanillas | .......... | G06F 16/9574 |
| 10,206,014 B2 * | 2/2019 | Trollope | ............. | G06F 16/7844 |

(Continued)

*Primary Examiner* — Vivian C Chin
*Assistant Examiner* — Friedrich Fahnert
(74) *Attorney, Agent, or Firm* — Ference & Associates LLC (57) ABSTRACT

One embodiment provides a method, including but not limited to: identifying, using a data capture device, a listener; determining, using a processor, audio content is inappropriate; and executing, using a processor, an action, wherein the action prevents the inappropriate audio content from being audible. Other aspects are described and claimed.

22 Claims, 3 Drawing Sheets

(56) References Cited

U.S. PATENT DOCUMENTS

| | | | |
|---|---|---|---|
| 2009/0187936 A1* | 7/2009 | Parekh | H04H 20/38 |
| | | | 725/25 |
| 2011/0082807 A1* | 4/2011 | Parekh | G06Q 10/107 |
| | | | 705/319 |
| 2011/0316996 A1* | 12/2011 | Abe | H04S 7/303 |
| | | | 348/77 |
| 2012/0019379 A1* | 1/2012 | Ben Ayed | G08B 13/1436 |
| | | | 340/539.1 |
| 2013/0201316 A1* | 8/2013 | Binder | H04L 67/12 |
| | | | 348/77 |
| 2014/0031961 A1* | 1/2014 | Wansley | H04W 4/021 |
| | | | 700/94 |
| 2014/0072185 A1* | 3/2014 | Dunlap | G06K 9/00288 |
| | | | 382/118 |
| 2014/0254820 A1* | 9/2014 | Gardenfors | H04R 3/005 |
| | | | 381/80 |
| 2014/0350935 A1* | 11/2014 | Schuster | G10L 15/08 |
| | | | 704/251 |
| 2016/0014540 A1* | 1/2016 | Kelly | H04S 7/303 |
| | | | 381/303 |

\* cited by examiner

ADJUSTING AUDIO CONTENT BASED ON AUDIENCE

BACKGROUND

Some people use information handling devices (e.g., smart phones, music players, radios, tablets, laptop computers, personal computers, etc.) to listen to audio content. Due to the portability of some information handling devices, this audio content may be listened to in a variety of locations (e.g., home, car, office, etc.), sometimes by a diverse audience. The audio content may be provided by different audio content providers (e.g., satellite, local radio stations, internet, etc.) using a wireless transmission. Alternatively, the audio content may be downloaded or bought by the listener and played on an information handling device.

BRIEF SUMMARY

In summary, one aspect provides a method, comprising: identifying, using a data capture device, a listener; determining, using a processor, audio content is inappropriate; and executing, using a processor, an action, wherein the action prevents the inappropriate audio content from being audible.

Another aspect provides an information handling device, comprising: a data capture device; a processor; a memory device that stores instructions executable by the processor to: identify, using the data capture device, a listener; determine audio content is inappropriate; and execute an action, wherein the action prevents the inappropriate audio content from being audible.

A further aspect provides a product, comprising: a storage device having code stored therewith, the code being executable by the processor and comprising: code that identifies, using data from a data capture device, a listener; code that determines, using a processor, the audio content is inappropriate; and code that executes, using a processor, an action, wherein the action prevents the inappropriate audio content from being audible.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Listeners of audio content (e.g., music, comedy routines, audio books, news, etc.) may use information handling devices (e.g., smart phones, mP3 players, radios, tablets, etc.) to receive or play their audio content. The audio content may be provided over a wireless connection (e.g., satellite, internet, local radio station, etc.) or may be acquired by the listener (e.g., downloaded, bought in a physical form, etc.). Due to the different sources of audio content, it may be hard to ensure that all the audio content provided is appropriate for the entire audience. Furthermore, a listener might be listening to content that is appropriate for the current audience, but is not appropriate for a new audience that joins in progress. For example, a parent might be listening to a comedy routine where the comedian routinely uses curse words. The parent may then pick their child up from school and forget to change the station, thereby exposing their children to the curse words.

When audio content is provided on a typical radio station, the consumer may not have to worry about the content because the radio station may prevent the use of inappropriate words. For example, some entertainers may choose to create a radio friendly version which may not include curse words. However, while this edited radio friendly version may rid the audio of the inappropriate words, the content of the audio may still be inappropriate due to the use of inappropriate phrases or suggestive content. Additionally, this requires other people to monitor and adjust the audio content. While some people may think the content is acceptable, some listeners may think the same content is inappropriate.

If the consumer is listening to audio content provided by a different source, the source may not play edited versions of the audio. For example, satellite radio may allow curse words to be used on the stations. Additionally, downloaded or purchased content may contain the inappropriate content as opposed to the cleaner edited version. This may require the listener to monitor and adjust the audio content, which may work as long as the listener is paying attention to the content or already knows the content. If the listener forgets to or fails to adjust the audio content, it may lead to embarrassing moments when some audience members are exposed to inappropriate content.

Accordingly, an embodiment provides a method of adjusting the audio content to be appropriate for the audience even if the audience changes while the audio content is playing. An embodiment may monitor and identify the audience to determine who is currently consuming the audio content. An embodiment may then determine whether the audio content is appropriate for the current audience. If the audience changes, an embodiment may determine whether the audio content is appropriate for the new audience. If an embodiment determines that the content is not appropriate for the audience an embodiment may execute an action to prevent the inappropriate content from being audible. For example, an embodiment may bleep a curse word in the audio content. One embodiment may additionally provide a notification to the user that inappropriate content is now being prevented.

The illustrated example embodiments will be best understood by reference to the figures. The following description is intended only by way of example, and simply illustrates certain example embodiments.

Figure 1:
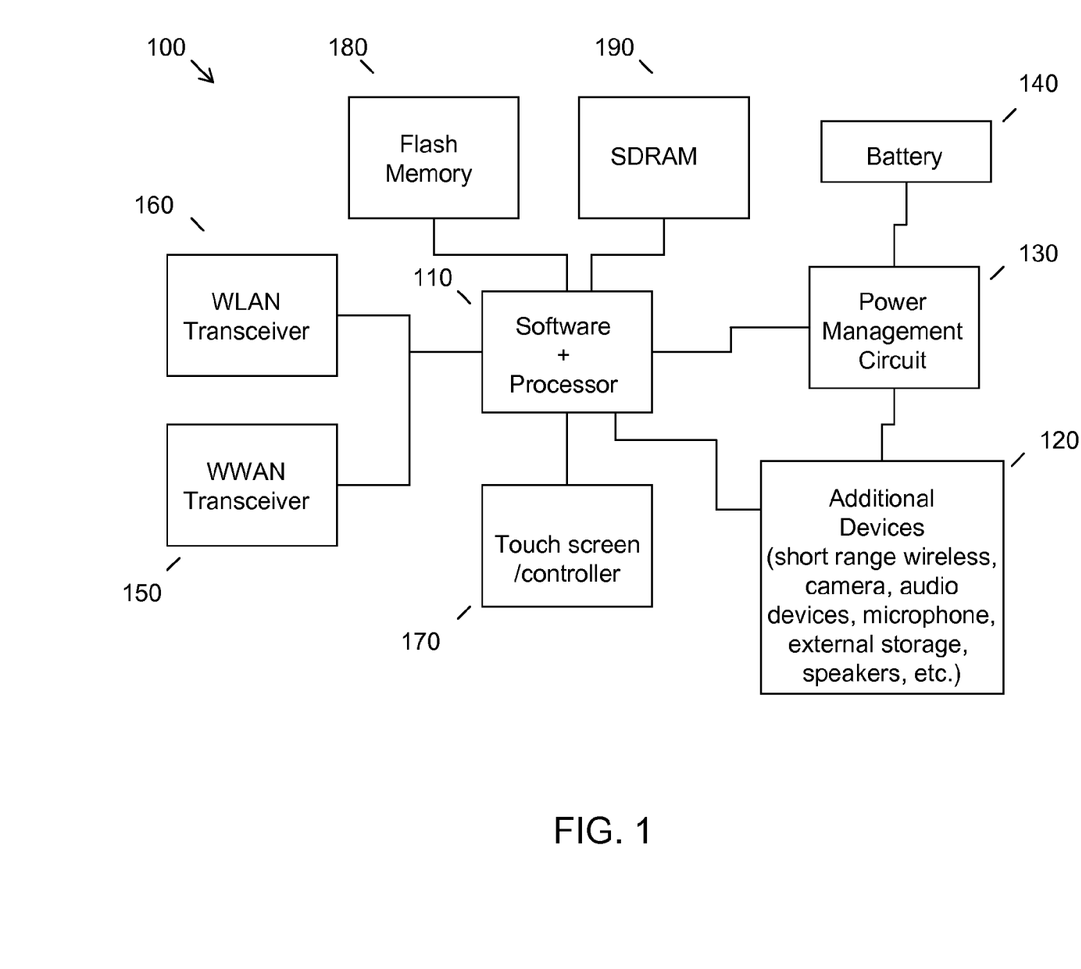
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., speakers, image capture device, audio capture device, external storage storing audio content, etc. System 100 often includes a touch screen 170 for data input and display/rendering. System 100 also typically includes various memory devices, for example flash memory 180 and SDRAM 190.

Figure 2:
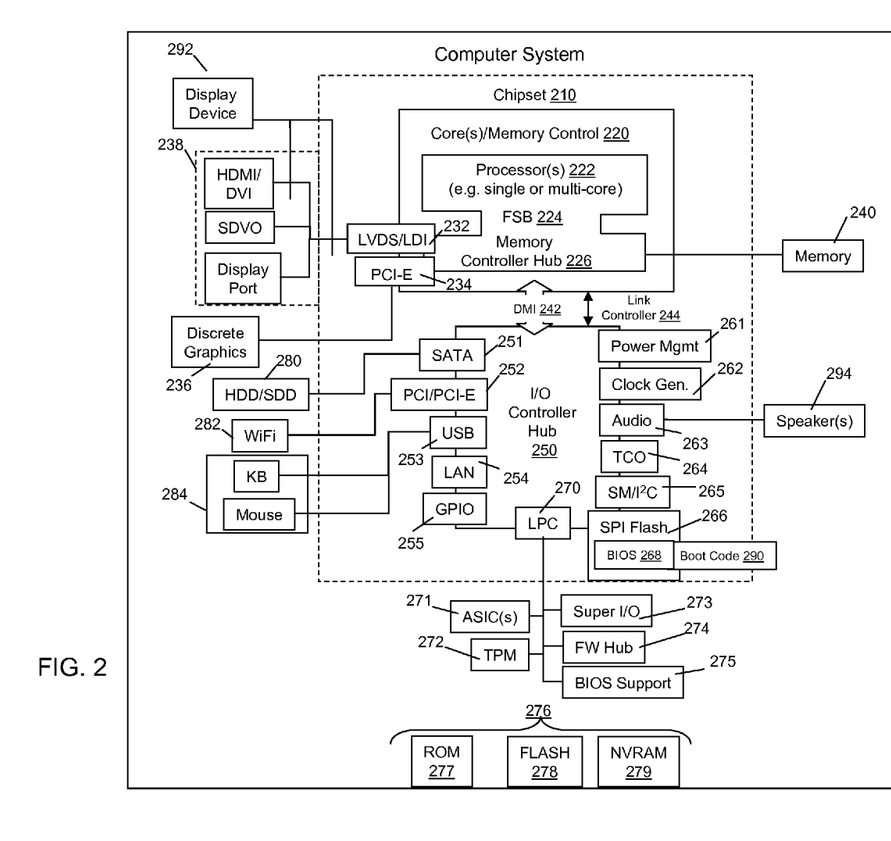
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to provide audio content. For example, the circuitry outlined in FIG. 1 may be implemented in a tablet or smart phone embodiment, whereas the circuitry outlined in FIG. 2 may be implemented in a personal computer embodiment.

Figure 3:
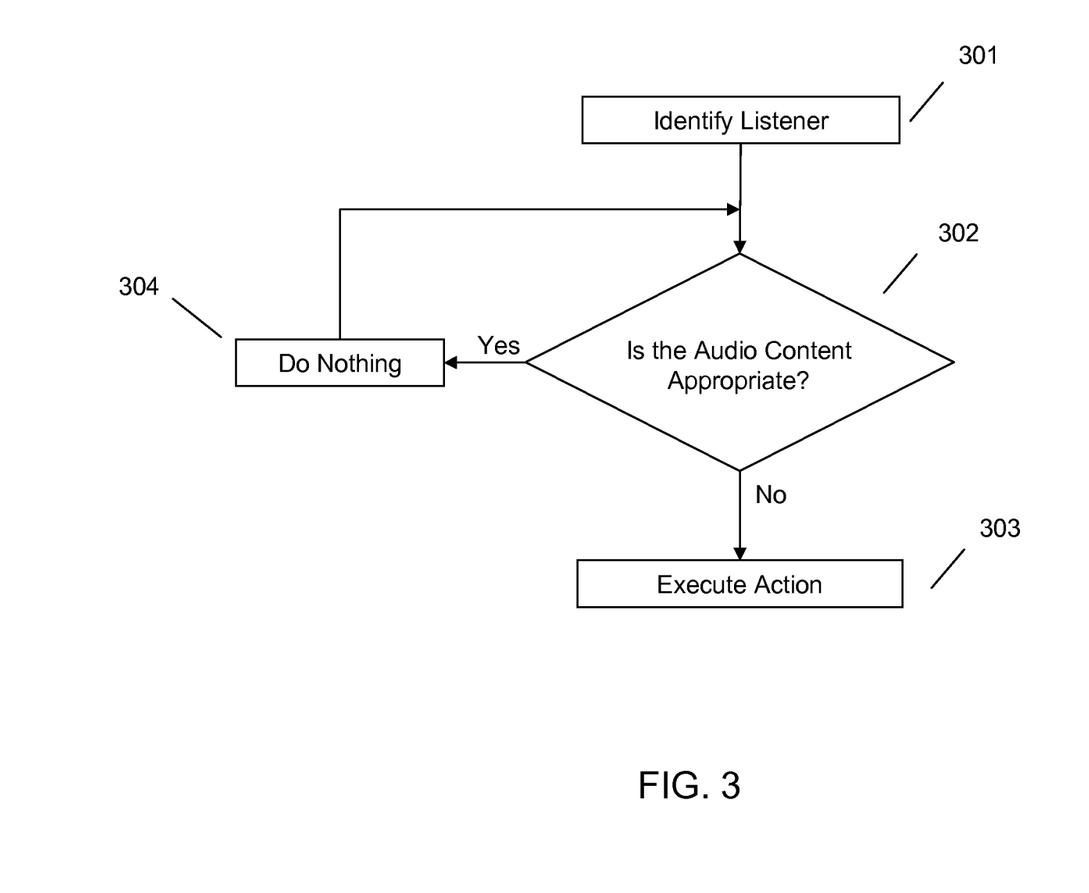
FIG. 3 illustrates an example method of adjusting audio content based on audience.

Referring now to FIG. 3, at 301, an embodiment may identify, using a data capture device, a listener ("audience"). An embodiment may additionally identify multiple listeners. While one embodiment may identify a listener as a particular person, one embodiment may not identify the listener as a particular person. For example, one embodiment may identify a particular number of people or a probability of who is the listener. Additionally or alternatively, the identification may identify the location of the listener and may make a determination of the likeliness of who the audience member may be. For example, an embodiment may determine that there are four people in a vehicle. Based upon historical data, an embodiment may determine that the additional audience members are likely children.

To make this identification an embodiment may receive data from a data capture device, indicating that at least one person is listening to the audio content. The data captured may comprise a variety of data to help identify the listener. In one embodiment, the data may include image data captured from an image capture device, voice recognition data captured from an audio capture device, sensor data captured from sensors, wireless signal data, location data (e.g., global positioning system data, wireless network data, etc.), time of day data, and the like. For example, an embodiment may capture sensor data indicating that a door has been opened. This may indicate that a person has entered or exited a location where audio content is being provided, for example, a home, car, office, and the like. As another example, an embodiment may receive pressure sensor or seat belt sensor data indicating that a person is sitting in a car seat. One example embodiment may use wireless signals to determine the audience. For example, an embodiment may determine the audience member based upon information handling device wireless data (e.g., cell phones, wireless watches, laptop computers, any other device with a detectable wireless signal, etc.). One embodiment may use infrared or radio signals to identify that an object, presumably a person, is in the location.

Once the data is received, an embodiment may compare the data to a rule set comprising data identifying the listener. This rule set may contain data indicating who a particular audience member is, or it may contain data indicating the likeliness of an audience member being present for which audio content may be inappropriate. For example, the rule set may contain image data indicating that a recognized person is an elderly person. As another example, the rule set may comprise data indicating that between the times of 4:00 p.m. and 6:00 p.m. a child is likely to be in a vehicle. As an example, an embodiment may receive GPS data. This GPS data may then be compared to the rule set, where the rule set indicates that the GPS data corresponds to a school. An embodiment may then determine that it is likely a child is in the vehicle because of the location of the vehicle. As another example, an embodiment may receive wireless data indicating that three smart phones are currently in the vehicle. The embodiment may then compare this data to a rule set where the rule set indicates that the wireless data is associated with three particular smart phones, one of which belongs to an adult over the age of 65.

The rule set may be configured by the user. For example, the user may enter data indicating data belonging to a particular person. As an example, the user may program an embodiment to know that a particular wireless signal belongs to a laptop belonging to a twelve-year-old child. A user may also be able to configure the rule set to use a particular rule set. For example, a user may desire that the embodiment first use voice recognition data to better identify the audience as opposed to sensor data. In other words, a user may be able to train an embodiment to better identify the audience.

At 302, an embodiment may determine whether the audio content is inappropriate. Content may be determined to be inappropriate in one scenario, for example, for a particular audience, and may be determined to be appropriate in another scenario, for example, for a different audience. For example, a user may allow curse words when the seventeen-year-old child is in the home, but not when the eleven-year-old child is in the home. In one embodiment, this determination may be made by transcribing the audio content. Using this method may require an embodiment to buffer the audio content and use a speech-to-text module to determine what is contained within the audio content. For example, the audio content may be a comedy routine. An embodiment may buffer the comedy routine and convert the speech to text. This may then allow an embodiment to determine if there is inappropriate content and where the inappropriate content is located within the audio content.

One embodiment may use this transcribed audio content and compare the words to a dictionary. The dictionary may contain inappropriate content. For example, the dictionary may contain a list of words and phrases that are deemed inappropriate. This dictionary may be configured by the user. For example, a user may edit the dictionary to add content that the user feels is inappropriate. Additionally or alternatively, when a user hears content that they deem inappropriate an embodiment may allow a user to provide input indicating such. For example, an embodiment may include a button that a user can push when content containing inappropriate material is heard. This may update the dictionary with the inappropriate content.

Alternatively or additionally, an embodiment may make the determination at 302 by identifying a characteristic associated with the audio content. This characteristic may be a variety of information allowing an embodiment to determine the appropriateness of the content. For example, the characteristic identified may include the entertainer delivering audio content (e.g., artist, comedian, news anchor, author, etc.), type of audio content (e.g., genre, audio book, etc.), source of the audio content (e.g., satellite, local radio, internet, distribution channel, etc.), rating of the audio content, audio content identifier (e.g., title, artist, producer, etc.), time associated with when the audio content is being presented (e.g., morning, evening, afternoon, late night, etc.), and the like. An embodiment may identify the characteristic using a variety of methods. For example, based upon the rhythm of the audio content, an embodiment may identify the name of the song. Identifying characteristics may also be available from the content provider. For example, satellite radio may include a song title and artist when providing a song. An embodiment may use this information to determine whether the content is inappropriate for the current audience.

An embodiment may use an identified characteristic to identify additional information about the audio content. For example, an embodiment may identify the name of a song that is playing. Using this information an embodiment may access a database (e.g., the cloud, internet, locally stored database, etc.), where the data may contain the lyrics to the song. Using this look up, an embodiment may determine a location in the song that may be considered inappropriate for the current audience. After identifying a characteristic, an embodiment may then compare the known characteristic or additional information gathered from the identification of the characteristic to a dictionary where the dictionary contains inappropriate content. This dictionary may also be user configurable. For example, a user may add songs titles, artists, or genres to the list of inappropriate content in the dictionary. In addition, a user may be able to add inappropriate content to the dictionary by providing a user input as described above.

One embodiment may not determine the exact inappropriateness of audio content, but may rather use historical data to determine the likeliness of inappropriate content. For example, an embodiment may identify the comedian associated with the comedy act. Using this information, an embodiment may determine that this comedian usually has inappropriate content in their comedy routines. An embodiment may then determine that this comedy routine will likely have inappropriate content and may deem this content to be inappropriate for the current audience. One embodiment may use a combination of determination factors to make a determination. For example, an embodiment may determine that a particular song has an edited version and an unedited version. The embodiment may then buffer the song and use speech-to-text recognition to determine which song version is being provided.

If an embodiment determines at 302, that the audio content is appropriate for the audience, it may do nothing at 304 and continue to determine whether new audio content is appropriate for the audience at 302. Alternatively, an embodiment may do nothing at 304 and wait until the audience changes and identify the new audience at 301. However, if an embodiment determines at 302 that the audio content is inappropriate for the current audience, it may execute an action preventing the inappropriate content from being audible. This action may include obscuring the inappropriate content (e.g., bleeping the content, muffling the content, etc.), muting the inappropriate content, modifying the audio content source (e.g., changing the source channel, changing the source, etc.), stopping the audio content, and the like. For example, if a listener is listening to an audio book and an embodiment determines the content is inappropriate for the child who just walked in the room, an embodiment may stop playing the audio book. Additionally or alternatively, the action may be configured by the user. For example, the user may configure an embodiment to obscure inappropriate words, but change the radio station if inappropriate content is contained within the audio content.

While in one embodiment this detection of audience members and appropriateness may be automatic, in one embodiment an information handling device may not perform this detection without user input. For example, a user may push a button or make a selection to enter this "safe mode", where an embodiment monitors audio content for appropriateness. In an additional embodiment, a notification may be provided to the user that the information handling device is currently in a mode where inappropriate content will be prevented. This notification may occur when an embodiment automatically enters this safe mode or when the user sets the information handling device for safe mode. In addition, a user may be able to provide a safe mode override if the user deems that the audience does not require monitoring.

Accordingly, as illustrated by the example embodiments and figures, an embodiment provides a method of adjusting audio content to ensure it remains appropriate for the audience even if the audience changes during the presentation of the audio content. An embodiment may identify the audience and determine whether the audio content currently playing is appropriate for the audience. In some example embodiments, this determination may be made by buffering the content and comparing the content to a list of inappropriate content. If an embodiment determines that the content is inappropriate, it may prevent the inappropriate content from being audible. For example, an embodiment may mute the inappropriate content or change the channel. One embodiment may additionally allow a user to enter this safe mode, while one embodiment may automatically enter this safe mode. An embodiment may also provide a notification to a listener that the information handling device is currently in safe mode. Thus, an embodiment allows a user to listen to audio content without the need to monitor the content to make sure it is appropriate for the audience.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, using a data capture device, the presence of at least one listener in an environment, from data selected from the group consisting of:
        data other than biometric data, wherein the data other than biometric data is generated based upon the presence of the at least one listener and a spatiotemporal attribute of the environment; and
        biometric data and data other than biometric data, wherein the biometric data and the data other than biometric data is generated based upon the presence of the at least one listener and a spatiotemporal attribute of the environment;
    determining, using a processor, audio content is inappropriate for the identified at least one listener; and
    executing, using a processor, an action, wherein the action prevents the inappropriate audio content from being audible.

2. The method of claim 1, wherein the identifying a listener comprises personal identification.

3. The method of claim 1, wherein the identifying a listener comprises receiving data from a data capture device indicating the presence of at least one listener and comparing the received data to a rule set, wherein the rule set comprises data identifying the at least one listener.

4. The method of claim 3, wherein the received data comprises data selected from the group consisting of: image data, voice recognition data, sensor data, wireless signal data, and location data.

5. The method of claim 1 wherein identifying a listener comprises receiving data from a data capture device indicating the presence of at least one listener.

6. The method of claim 1, wherein the determining comprises transcribing the audio content.

7. The method of claim 6, wherein the determining further comprises comparing the transcribed audio content to a dictionary, wherein the dictionary comprises inappropriate audio content.

8. The method of claim 1, wherein the determining further comprises comparing the identified characteristic to a dictionary, wherein the dictionary comprises inappropriate audio content.

9. The method of claim 1, wherein the characteristic is a characteristic selected from the group consisting of: entertainer delivering audio content, type of audio content, source of the audio content, rating of the audio content, audio content identifier, and time associated with when the audio content is being presented.

10. The method of claim 1, wherein the action comprises an action selected from the group consisting of: obscuring the inappropriate content, muting the inappropriate content, modifying the audio content source, and stopping the audio content.

11. An information handling device, comprising:
    a data capture device;
    a processor;
    a memory device that stores instructions executable by the processor to:
    identify, using the data capture device, the presence of at least one listener in an environment, from data selected from the group consisting of:
        data other than biometric data, wherein the data other than biometric data is generated based upon the presence of the at least one listener and a spatiotemporal attribute of the environment; and
        biometric data and data other than biometric data, wherein the biometric data and the data other than biometric data is generated based upon the presence of the at least one listener and a spatiotemporal attribute of the environment;
    determine audio content is inappropriate for the identified at least one listener; and
    execute an action, wherein the action prevents the inappropriate audio content from being audible.

12. The information handling device of claim 11, wherein the identifying a listener comprises personal identification.

13. The information handling device of claim 11, wherein to identify a listener comprises receiving data from a data capture device indicating the presence of at least one listener and comparing the received data to a rule set, wherein the rule set comprises data identifying the at least one listener.

14. The information handling device of claim 13, wherein the received data comprises data selected from the group consisting of: image data, voice recognition data, sensor data, wireless signal data, and location data.

15. The information handling device of claim 11, wherein to identify a listener comprises receiving data from a data capture device indicating the presence of at least one listener.

16. The information handling device of claim 11, wherein to determine comprises transcribing the audio content.

17. The information handling device of claim 16, wherein to determine further comprises comparing the transcribed audio content to a dictionary, wherein the dictionary comprises inappropriate audio content.

18. The information handling device of claim 11, wherein to determine further comprises comparing the identified characteristic to a dictionary, wherein the dictionary comprises inappropriate audio content.

19. The information handling device of claim 11, wherein the characteristic is a characteristic selected from the group consisting of:
    entertainer delivering audio content, type of audio content, source of the audio content, rating of the audio content, audio content identifier, and time associated with when the audio content is being presented.

20. A product, comprising:
    a storage device having code stored therewith, the code being executable by the processor and comprising:
    code that identifies, using data from a data capture device, the presence of at least one listener in an environment, from data selected from the group consisting of:
        data other than biometric data, wherein the data other than biometric data is generated based upon the presence of the at least one listener and a spatiotemporal attribute of the environment; and biometric data and data other than biometric data, wherein the biometric data and the data other than biometric data is generated based upon the presence of the at least one listener and a spatiotemporal attribute of the environment;

code that determines, using a processor, the audio content is inappropriate for the identified at least one listener; and code that executes, using a processor, an action, wherein the action prevents the inappropriate audio content from being audible.

21. The product of claim 20, wherein the code that identifies a listener uses personal identification.

22. The product of claim 20, wherein the code that identifies a listener receives data from a data capture device indicating the presence of at least one listener.

\* \* \* \* \*